United States Patent [19]

Shackle

[11] Patent Number: 5,491,039

[45] Date of Patent: Feb. 13, 1996

[54] SOLID ELECTROLYTES INCLUDING ORGANOMETALLIC ION SALTS AND ELECTROLYTIC CELLS PRODUCED THEREFROM

[76] Inventor: Dale R. Shackle, 17135 Oak Leaf Dr., Morgan Hill, Calif. 95037

[21] Appl. No.: 192,392

[22] Filed: Feb. 4, 1994

[51] Int. Cl.[6] .................................................. H01M 6/18
[52] U.S. Cl. ........................ 429/192; 429/194; 429/198; 29/623.1; 252/62.2
[58] Field of Search ................................. 429/192, 198, 429/194; 252/62.2; 29/623.1

[56] References Cited

U.S. PATENT DOCUMENTS

| | | | |
|---|---|---|---|
| 4,060,674 | 11/1977 | Klemann et al. ..................... | 429/194 |
| 4,115,206 | 9/1978 | Murtha . | |
| 4,247,499 | 1/1981 | Glugla et al. . | |
| 4,384,115 | 5/1983 | Renga . | |
| 4,388,385 | 6/1983 | Sekido et al. . | |
| 4,394,280 | 7/1983 | von Alpen et al. . | |
| 4,414,607 | 11/1983 | Sekido et al. . | |
| 4,423,205 | 12/1983 | Rajan . | |
| 4,432,891 | 2/1984 | Susman et al. . | |
| 4,539,236 | 9/1985 | Vilutis . | |
| 4,557,985 | 12/1985 | Voss . | |
| 4,695,291 | 9/1987 | Plavac . | |
| 4,747,850 | 5/1988 | Wollenberg et al. . | |
| 4,752,544 | 6/1988 | Gregory ................................. | 429/188 |
| 4,830,939 | 5/1989 | Lee et al. . | |
| 4,894,302 | 1/1990 | Hoffman et al. ....................... | 429/194 |
| 4,908,283 | 3/1990 | Takahashi et al. . | |
| 4,925,751 | 5/1990 | Shackle et al. . | |
| 4,990,413 | 2/1991 | Lee et al. . | |
| 5,237,031 | 8/1993 | Kubota et al. ......................... | 526/305 |

OTHER PUBLICATIONS

Abraham et al, "Solid–State Rechargeable Lithium Batteries Utilizing Polyphosphazene–Based Polymer Electrolytes", Proc. Int. Power Sources Symp., 34th, pp. 81–83 (1990) (month n/a).

Abraham et al, "Polyphosphazene–Poly(Olefin Oxide) Mixed Polymer Electrolytes", J. Electrochemical Society, vol. 138, No. 4, pp. 921–927 (1991) (month n/a).

Edgell et al, "Synthesis of Methyl-$d_3$ Alcohol and Methyl-$d_3$ Fluoride", J.Am. Chem. Soc., vol. 77, Nov. 5, 1955.

*Primary Examiner*—Prince Willis, Jr.
*Assistant Examiner*—M. Nuzzolillo

[57] ABSTRACT

This invention is directed to solid electrolytes containing an ion salt which function as a source of ions for producing conductivity. The anion portion of the ion salt is an organometallic structure which is capable of enhancing the ion conduction of electrolytic cells incorporating the solid electrolytes.

32 Claims, No Drawings

SOLID ELECTROLYTES INCLUDING ORGANOMETALLIC ION SALTS AND ELECTROLYTIC CELLS PRODUCED THEREFROM

BACKGROUND OF THE INVENTION

1. Field of the Invention

This invention is directed to solid electrolytes containing a polymer matrix and (optionally) an electrolyte solvent (plasticizer) for the polymer matrix. In particular, this invention is directed to solid electrolytes containing an ion salt having an organometallic anion (hereinafter referred to as an organometallic ion salt). The organometallic ion salt can partially or completely replace the inorganic ion salt and electrolytic solvent heretofore added to the electrolyte in prior art electrolyte compositions.

This invention is further directed to solid electrolytic cells (batteries) containing an anode, a cathode and a solid electrolyte containing a polymer matrix, an optional solvent and an organometallic ion salt incorporated into the polymer matrix.

This invention is also directed to a method for enhancing the ion conduction of a solid electrolytic cell by employing a solid electrolyte which contains the organometallic ion salt of the invention.

2. State of the Art

Electrolytic cells containing an anode, a cathode and a solid, solvent-containing electrolyte incorporating an inorganic ion salt are known in the art and are usually referred to as "solid batteries". These cells offer a number of advantages over electrolytic cells containing a liquid electrolyte (i.e., "liquid batteries") including improved safety features.

Solid batteries employ a solid electrolyte interposed between a cathode and an anode. The solid electrolyte contains either an inorganic or an organic matrix and a suitable inorganic ion salt as a separate component. The inorganic matrix may be non-polymeric [e.g, β-alumina, silver oxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908, 283. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O-$ where R' is hydrogen or lower alkyl of from 1-6 carbon atoms.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte incorporating a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain a solvent (plasticizer) which is added to the matrix primarily in order to enhance the solubility of the inorganic ion salt in the solid electrolyte and thereby increase the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like.

Heretofore, the solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (usually a glyme and an organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrolytic cell).

Regardless of which of the above techniques is used, the resulting solid electrolyte could be improved with respect to conductivity. For example, even under the best of circumstances, the inorganic ion salts typically have a transference number between 0.4 and 0.55, meaning that the ion salt carries only between 40% and 55% of the total plus (+) charge.

The relatively low transference number also adversely affects cumulative capacity. The cumulative capacity of a solid battery is defined as the summation of the capacity of the battery over each cycle (charge and discharge) in a specified cycle life.

Another area in need of improvement is solvent characteristics, in particular solvent volatility. A significant quantity of solvent evaporates during processing to form the solid electrolyte. To retain sufficient solvent in the final product therefore requires a higher initial amount of solvent in the electrolyte formulation. This increases both raw material costs and processing costs since the evaporated solvent must either be recaptured and recycled or disposed of.

In view of the above, the art is searching for methods to increase the conductivity of solid electrolytes as well as to increase the cumulative capacity of solid batteries employing such electrolytes. Furthermore, there is a need in the art for reducing or eliminating solvent volatility.

SUMMARY OF THE INVENTION

The present invention is directed, in part, to the discovery that the use of an organometallic ion salt in solid, solvent-containing electrolytes provides a beneficial increase in conductivity and cumulative capacity of a solid battery. In particular, the invention provides for reducing or eliminating the use of inorganic ion salts in preparing the solid electrolyte. In place of the inorganic salts, an organometallic ion salt is used, which includes as the organic portion an alkyl, aromatic, ether or amine group which functions in an analogous manner to the electrolytic solvent. Hence, it is possible to also reduce or eliminate completely the use of electrolytic solvents.

By reducing the amount of, or eliminating completely, the inorganic ion salt and the electrolytic solvent in the electrolyte, the conductivity and cumulative capacity of the solid battery is increased. This improvement is brought about by the ability of the organometallic ion to provide a path for ion conductance. Specifically, the organic portion of the organometallic anion functions in a manner similar to the electrolyte solvent, whereby conductivity is increased by increasing the solubility of the metal ion.

Furthermore, since the "solvent" function of the electrolyte is now taken up by the salt itself, volatility is greatly reduced since the vapor pressure of the anion containing the organic moiety is much less than that of the equivalent amount of solvent replaced by the anion.

Accordingly, in one of its composition aspects, this invention is directed to a solid, single-phase electrolyte which comprises:

a solid polymeric matrix; and an ionically conducting amount of an organometallic ion salt selected from the group consisting of:

$$M_c(AR_n) \qquad \qquad I$$

where M is a metal ion selected from the group consisting of Li, Na, K and Mg; A is a metal ion selected from the group consisting of Al, Ti and B; R is selected from the group consisting of an alkyl group having from 1 to 6 carbon atoms, an unsubstituted or substituted aromatic group having from 6 to 11 carbon atoms, a mono or dialkyl amine having from 1 to 8 carbon atoms, and a cyclic or linear ether having the formula $—O(R_1O)_p$ where $R_1$ is an alkyl group having from 1 to 6 carbon atoms and p is an integer from 1 to 4, c is 1 or 2, and n is an integer from 1 to 6.

In another of its composition aspects, the present invention is directed to an electrolytic cell which comprises:

an anode containing a compatible anodic material;

a cathode containing a compatible cathodic material; and interposed therebetween a solid electrolyte which comprises:

a solid polymeric matrix; and an ion conducting amount of an organometallic ion salt selected from the group consisting of:

$$M_c(AR_n) \qquad \qquad I$$

where M, A, R, c and n are as defined above.

In one of its method aspects, the present invention is directed to a method for enhancing the ion conductance of an electrolytic cell which comprises employing the solid, single-phase, solvent-containing electrolyte described above in the electrolytic cell.

DETAILED DESCRIPTION OF THE PREFERRED EMBODIMENTS

As noted above, this invention is directed to solid electrolytes which, by virtue of the organometallic ion salt employed, provide for increased ion conductance and cumulative capacity. However, prior to describing this invention in further detail, the following terms will first be defined.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and/or from partial polymers of a solid matrix forming monomer.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of the organometallic ion salt of the invention and optionally (when the organometallic ion salt does not completely replace the inorganic ion salt/solvent system) in the presence of an inorganic ion salt and/or a solvent such as a mixture of an organic carbonate and a glyme compound, to form solid matrices which are suitable for use as solid electrolytes in electrolytic cells. Suitable solid matrix forming monomers are well known in the art and the particular monomer employed is not critical. Preferably, the solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438, filed Jul. 22, 1992, and entitled "SOLID ELECTROLYTES DERIVED BY POLYMERIZATION OF VINYL SULFONATE POLYALKYLENE OXIDES" now U.S. Pat. No. 5,262,253 which application is incorporated herein by reference in its entirety), and the like as well as mixtures thereof. Ethylene oxide is especially preferred.

Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of the organometallic ion salt of the invention, and optionally an inorganic ion salt and/or a solvent or solvent mixture, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include, by way of example, heating the monomer, irradiating the monomer with UV light, electron beams, etc. The resulting cured product preferably contains repeating units containing at least one heteroatom such as oxygen or nitrogen which is capable of forming donor acceptor bonds with inorganic cations (e.g., alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the organometallic ion salt. For example, a composition comprising requisite amounts of the solid matrix forming monomer or monomers, solvent, and organometallic ion salt can be applied to a substrate and then cured. Alternatively, the solid matrix forming monomer can be first cured and then dissolved into a suitable volatile solvent. Requisite amounts of the organometallic ion salt can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. Representative examples are alkali metal salts of less mobile anions of weak bases having a large anionic radius. Examples of such anions are I, Br, SCN, $ClO_4$, $BF_4$, $PF_6$, $AsF_6$, $CF_3COO$, $CF_3SO_3$, etc. Specific examples of suitable inorganic ion salts include $LiClO_4$, LiI, LiSCN, $LiBF_4$, $LiAsF_6$, $LiCF_3SO_3$, $LiPF_6$, NaI, NaSCN, KI, and the like. The inorganic ion salt preferably contains at least one atom of Li, Na, K or Mg.

The term "organic carbonate" refers to hydrocarbyl carbonate compounds of no more than about 12 carbon atoms and which do not contain any hydroxyl groups. The organic carbonates are useful as electrolyte solvents either alone or in combination with another solvent such as triglyme. Preferably, the organic carbonate is a linear aliphatic carbonate or a cyclic aliphatic carbonate.

In a more preferred embodiment, the carbonate is a cyclic aliphatic carbonate represented by the formula:

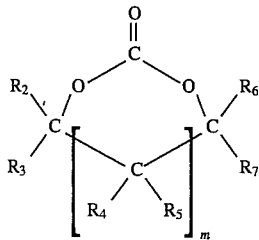

where each of $R_2$, $R_3$, $R_4$, $R_5$, $R_6$, and $R_7$ are independently selected from the group consisting of hydrogen and alkyl of 1 or 2 carbon atoms, and m is an integer equal to 0 or 1.

In a particularly preferred embodiment, m is equal to zero and $R_2$, $R_3$, and $R_6$ are hydrogen and $R_7$ is hydrogen (ethylene carbonate), —$CH_3$ (propylene carbonate) or —$CH_2CH_3$ (butylene carbonate).

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro [1,3-oxa-2-cyclohexanone- 5',5',1',3'-oxa-2'-cyclohexanone].

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety.

Additional suitable cyclic aliphatic carbonates are disclosed in U.S. Pat. No. 4,747,850 which is also incorporated herein by reference in its entirety.

In a more preferred embodiment, linear aliphatic carbonates are represented by the formulae:

$$R_8[OC(O)]_tOR_9$$

and $$R_8[OC(O)R_{10}]_uOC(O)R_9$$

where each $R_8$ and $R_9$ are independently selected form the group consisting of alkyl of from 1 to 4 carbon atoms; $R_{10}$ is an alkylene group of from 2 to 4 carbon atoms; t is an integer of 1 or 2, and u is an integer from 1 to 4.

Most preferably, the linear aliphatic carbonate is a carbonate of the formula:

$$R_8[OC(O)]_tOR_9$$

where $R_8$, $R_9$ and t are as defined above.

Linear aliphatic carbonates are well known in the art, a variety of which are commercially available. Additionally, the linear aliphatic carbonates can be prepared by transesterification of a suitable alcohol (e.g., $R_8OH$ or $R_9OH$) with, e.g., diethyl carbonate under transesterification conditions.

In addition to being used as solvents, the above-described cyclic and linear organic carbonates are used in forming one embodiment of the organometallic ion salt of the invention.

The term "organometallic ion salt" refers to salts having the formula $M_c(AR_n)$ as defined above. The organometallic ion salts of the invention are produced by well known techniques, for example by the synthesis disclosed in Edgell and Parts, "Synthesis of Methyl-$d_3$ Alcohol and Methyl-$d_3$ Fluoride" J.Am. Chem. Soc , Vol. 77, Nov. 5, 1955, which is herein incorporated by reference.

The term "alkylene glycol(ether)" refers to a glycol or glycol ether having at least one terminal hydroxyl group. In one embodiment of the invention, an organometallic ion salt can be formed from an alkylene glycol(ether), wherein the alkylene glycol(ether) is reacted with a metallic hydride containing one of Li, Na, K or Mg and one of Al, Ti or B. In general, the alkylene glycol(ether) has the formula $HO(R_1O)_pOH$ or the formula $R_{11}(R_1O)_pOH$ where $R_1$ and $p$ are as defined above, and $R_{11}$ is an alkyl group having from 1 to 3 carbon atoms.

The term "glyme" refers to ethylene glycol dimethyl ether or $CH_3OCH_2CH_2OCH_3$. The term "a glyme" refers to glyme and also to diglyme, triglyme, tetraglyme, etc., which contain repeating units of $-(OCH_2CH_2)-$.

The term "electrolytic cell" refers to a composite containing an anode, a cathode and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys such as alloys of lithium with aluminum, mercury, tin, zinc, and the like, and intercalation based anodes such as carbon, tungsten oxides and the like.

The cathode is typically comprised of a compatible cathodic material (i.e., insertion compounds) which is any material which functions as a positive pole in a solid electrolytic cell. Such compatible cathodic materials are well known in the art and include, by way of example, manganese oxides, molybdenum oxides, vanadium oxides, sulfides of titanium and niobium, lithiated cobalt oxides, the various lithiated manganese oxides, chromium oxides, copper oxides, and the like. The particular compatible cathodic material employed is not critical.

In one preferred embodiment, the compatible cathodic material is mixed with an electroconductive material including, by way of example, graphite, powdered carbon, powdered nickel, metal particles, electronically conductive polymers (i.e., characterized by a conjugated network of double bonds like polypyrrole, polyacetylene, polyaniline and polythiophene and the like), and a binder, such as a polymeric binder, to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a solid matrix forming monomer or partial polymer thereof. Also included is an ion conducting amount of the organometallic ion salt of Formula I. Generally, the amount of the salt is from about 1 to about 25 weight percent. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. One particularly preferred current collector for the cathode is a roughened nickel (electrolytically deposited nickel) on nickel current collector (available as CF18/NiT from Fukuda Metal Foil & Powder Company, Ltd., Kyoto, Japan). Another preferred current collector employs a sheet of aluminum foil. The current collector is preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent (if one is used) and the cathode solvent are identical.

The term "urethane acrylate" refers to urethane diacrylate.

Methodology

Methods for preparing solid, solvent-containing electrolytes are well known in the art. This invention, however, utilizes a particular organometallic ion salt in the preparation of solid electrolytes, wherein the salt provides improvements in electrolyte conductivity and cumulative capacity.

As noted above, organic carbonates are either commercially available or can be prepared by art-recognized methods. Similarly, alkylene glycol(ethers) which can be reacted to form the organometallic ion salts of Formula I above are also either commercially available or can be prepared by art-recognized methods. For example, the preparation of $R_{11}(OR_1)_pOH$ compounds, where R, $R_1$ and $p$ are as defined above, and $R_{11}$ is an alkyl group having from 1 to 3 carbon atoms, can be readily prepared by reaction of an ethylene oxide derivative [an oxide derived from $CH_2=CH_2$ by conventional methods] with ROH under polymerization conditions. See, for example, U.S. Pat. No. 4,695,291 which is incorporated herein by reference.

For preparation of alkylene glycol (ethers), careful control of reaction conditions and the stoichiometry, e.g., 3 moles of the ethylene oxide derivative to 1 mole of ROH when p=3, will result in formation of a mixture of oligomers of the formula $R(OCH_2CH_2)_pOH$ wherein the mixture will contain a substantial amount of the trimer (p=3) as well as other oligomers such as the dimer and tetramer, etc. (i.e., p=2, p=4, etc.). The trimer can then be separated from the reaction mixture by conventional methods including distillation, column chromatography, high performance liquid chromatography (HPLC), and the like. The resulting hydroxy-terminated oligomers are then reacted with a metallic hydride to form the corresponding organometallic ion salt.

Similarly, organometallic ion salts having as the organic portion an alkyl group, aromatic group, or a mono or dialkylamine can be formed by reaction of the halosubstituted organic molecule with a metallic hydride.

Alternatively, the organometallic ion salt can be formed by successive reactions as follows:

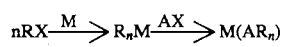

where A, M, n and R are as defined above, and X represent a halogen atom such as fluorine, chlorine, bromine, etc.

The organometallic ion salt can also be in the form of a chelated compound. Chelated compounds can be formed by reactions of a cyclic carbonate and metal hydride. For example:

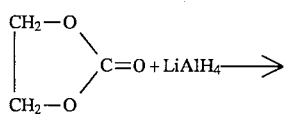

The solid electrolyte may be prepared by combining one or more solid matrix-forming monomers and optionally a solvent wherein either one or both the solid matrix-forming monomers and the optional solvent includes an organometallic ion salt as defined above. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns (μm). Preferably, the solid, solvent-containing electrolyte may have a thickness of from about 20 to about 250 microns. The final thickness will depend on the particular application.

The electrolyte composition typically comprises from about 5 to about 25 weight percent of the organometallic ion salt based on the total weight of the electrolyte; preferably, from about 10 to 20 weight percent; and even more preferably from about 10 to about 15 weight percent.

The electrolyte composition typically comprises from zero to about 80 weight percent electrolyte solvent (e.g., organic carbonate/glyme mixture) based on the total weight of the electrolyte; preferably from about 60 to about 80 weight percent; and even more preferably about 70 weight percent. Generally the amount of electrolyte solvent is reduced compared to prior art electrolyte formulations. The amount of solvent necessary is at least partially determined by whether the organometallic ion salt is solid at room temperature. If so, then solvent is generally required, at least to the extent needed to dissolve the organometallic ion salt.

The electrolyte composition typically comprises from about 5 to about 30 weight percent of the solid polymeric matrix based on the total weight of the electrolyte; preferably from about 15 to about 25 weight percent.

In a preferred embodiment, the organometallic ion salt completely replaces the inorganic ion salt of the prior art. However, partial replacement of the inorganic ion salt is also possible. Thus, in another preferred embodiment, less than 100%, but at least about 20% by weight of the inorganic ion salt (on a w/w basis for the same metal cation) is replaced by the organometallic ion salt.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Geigy, Ardsley, New York), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

The resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in mono-, di-, tri- and higher functional acrylate monomers as well as in the urethane acrylate prepolymers, are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising at least one solid matrix forming monomer, an organometallic ion salt of the invention, an inorganic ion salt (if present) and a solvent mixture of an organic carbonate and a glyme compound. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed, so that the surface of the anode is coated with a composition comprising a solid matrix forming monomer, the solvent mixture of an organic carbonate and a glyme, and the organometallic ion salt. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

Utility

The organometallic ion salts of the invention, when used in the preparation of solid electrolytes, increase both the conductivity and the charge transference, resulting in improved cumulative capacity compared to solid electrolytes in which only an inorganic ion salt is present.

The following examples are offered to illustrate the present invention and should not be construed in any way as limiting its scope.

EXAMPLE 1

A. The Cathode

The cathode may be prepared from a cathodic paste which, in turn, is prepared from a cathode powder as follows:

i. Cathode Powder

The cathode powder is prepared by combining 90.44 weight percent $V_6O_{13}$ prepared by heating ammonium metavanadate ($NH_4^+VO_3$) at 450° C. for 16 hours under N2 flow] and 9.56 weight percent of carbon (from Chevron Chemical Company, San Ramon, Calif. under the trade name of Shawinigan Black®). About 100 grams of the resulting mixture is placed into a grinding machine (Attritor Model S-1 purchased from Union Process, Akron, Ohio) and ground for 45 minutes. Afterwards, the resulting mixture is dried at about 260° C. for 16 hours under vacuum to provide a cathode powder having about 84.45 weight percent $V_6O_{13}$.

The above mixing procedure is repeated to provide for a total of 292 grams of cathode powder.

ii. Cathode Paste

A cathode paste may be prepared by combining sufficient cathode powder to provide for a final product having 45 weight percent $V_6O_{13}$.

Specifically, about 26.2 grams of unground carbon (from Chevron Chemical Company, San Ramon, Calif. under the trade name of Shawinigan Black®) is combined in a glove box [under dry (<10 ppm $H_2O$) argon at ambient temperature and pressure] with about 169.9 grams of a 4:1 w/w mixture of propylene carbonate/triglyme and the resulting composite is mixed under, dry argon and at ambient temperature and pressure on a double planatary mixer (Ross #2 mixer available from Charles Ross & Sons, Company, Hauppag, N.Y.) at about 25 rpms until a paste is formed.

About 225.0 grams of a cathode powder prepared in a manner similar to that described above is added to the mixer and the resulting composite is mixed under dry argon and at ambient temperature and pressure on a double planatary mixer at about 25 rpms until a dry paste is formed.

About 5 grams of polyethylene oxide (number average molecular weight about 600,000 available as Polyox WSR-205 from Union Carbide Chemicals and Plastics, Danbury, Conn.), about 42.5 grams of polyethylene glycol diacrylate (molecular weight about 400 available as SR-344 from Sartomer Company, Inc., Exton, Pa.) and containing less than about 50 ppm of inhibitor, and about 7.5 grams of ethoxylated trimethylpropane triacrylate (TMPEOTA) (molecular weight about 450 available as SR-454 from Sartomer Company, Inc., Exton, Pa.) and containing less than about 50 ppm of inhibitor are added to about 169.9 grams of a 4:1 mixture of propylene carbonate/triglyme as described above and this mixture then added to the mixer.

The resulting slurry in the mixer is heated at about 65° C. while mixing for 2 hours at 60 rpms to provide for the cathodic paste which would have the following approximate weight percent of components:

| | |
|---|---|
| $V_6O_{13}$ | 45.00 weight percent |
| Carbon | 10.00 weight percent |
| Propylene carbonate | 27.18 weight percent |
| Triglyme | 6.80 weight percent |
| Polyethylene glycol diacrylate | 8.51 weight percent |
| Ethoxylated trimethylpropane triacrylate[1] | 1.51 weight percent |
| Polyethylene oxide | 1.00 weight percent |

[1]Inhibitor may be removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin, which results in less than 50 ppm of inhibitor in the product.

In an alternative embodiment, the requisite amounts of all of the cathodic materials other than the cathode powder can be combined to form a first mixture and this first mixture is combined with the cathode powder to form a second mixture. This second mixture is then thoroughly mixed to provide for the cathode paste.

The cathode paste prepared as above is placed onto a sheet [about 1 mil (≈25 μm) thick by 10 cm wide] of a roughened nickel on nickel current collector (available as CF18/NiT from Fukuda Metal Foil & Powder Company, Ltd., Kyoto, Japan). A Mylar cover sheet is then placed over the paste and the paste is spread to a thickness of about 75 microns (μm) with a conventional plate and roller system and cured by continuously passing the sheet through an electron beam apparatus (Electrocurtain, Energy Science Inc., Woburn, Mass.) at a voltage of about 175 kV and a current of about 12 mA and at a conveyor belt speed setting of 50 which provides a conveyor speed of about 3 in/sec. After curing, the Mylar sheet is removed to provide for a solid cathode laminated to a nickel on nickel current collector.

B. Electrolyte

The electrolyte may be prepared by first combining 56.51 grams of propylene carbonate, 14.13 grams triglyme and 17.56 grams of urethane acrylate (available as Photomer 6140 from Henkel Corporation, Coating and Chemicals Division, Ambler, Pa.). The propylene carbonate/triglyme/ urethane acrylate mixture is dried over molecular sieves (Grade 514, 4 Å, 8–12 mesh, available from W. R. Grace, Baltimore, Md.) to remove water.

This solution is then combined with 2.56 grams of polyethylene oxide (weight average molecular weight about 600,000 available as Polyox WSR-205 from Union Carbide Chemicals and Plastics, Danbury, Conn.). The mixture is then thoroughly mixed with the same laboratory mixer at heating until a temperature of about 65° C. is reached and then cooled to ambient temperature over at least a 2 hour period while stirring is maintained.

Once the polyethylene oxide is dispersed and dissolved, 9.24 grams of $Li^+[Al(OCH_2CH_2OCH_3)_4]^-$ are added while stirring with a laboratory mixer (Yamato Model LR41B, available from Fisher Scientific, Santa Clara, Calif.). The $Li^+[Al(OCH_2CH_2OCH_3)_4]^-$ salt can be purchased from CM Chemical Products, Berkeley Heights, N.J. 07922.

The resulting 100 gram mixture would contain the following weight percent of components:

| | |
|---|---|
| Propylene carbonate | 56.51 weight percent |
| Triglyme | 14.13 weight percent |
| Urethane acrylate (Photomer 6140) | 17.56 weight percent |
| $LI^+[Al(OCH_2CH_2OCH_3)_4]^-$ | 9.24 weight percent |
| Polyethylene oxide | 2.56 weight percent. |

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contains a solid electrolyte laminated to a solid cathode which, in turn, is laminated to a nickel on nickel current collector.

C. Anode

The anode may comprise a sheet of lithium foil (about 76 μm thick) which is commercially available from FMC Corporation Lithium Division, Bessemer City, N.C.

D. The Solid Battery

A solid battery may be prepared by first preparing a cathodic paste as described above which is spread onto a substrate (e.g., a current collector) and then cured to provide the cathode. An electrolyte composition as described above is then placed onto the cathode surface and cured to provide for the solid electrolyte. Then, the anode is laminated onto the solid electrolyte to provide for the solid battery.

EXAMPLES 2–4

Additional solid batteries may be prepared in a manner similar to that of Example 1 except that the organometallic ion salt is

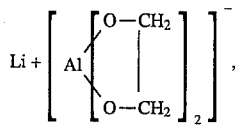

(Example 2) $Li^+[B(OCH_2CH_2OCH_3)_4]^-$ (Example 3), or $Li^+[Ti(OCH_2CH_2OCH_3)_6]^-$ (Example 4). In each of Examples 2–4, the amount of the organometallic ion salt added provides an amount of lithium equivalent to that provided in Example 1.

EXAMPLE 5

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. Specifically, the adhesion promoter layer is prepared as a dispersed colloidal solution in one of two methods. The first preparation of this colloidal solution for this example is as follows:

| | |
|---|---|
| 84.4 | weight percent of carbon powder (Shawinigan Black ® — available from Chevron Chemical Company, San Ramon, CA) |
| 337.6 | weight percent of a 25 weight percent solution of polyacrylic acid (a reported average molecular weight of about 90,000, commercially available from Aldrich Chemical Company — contains about 84.4 grams polyacrylic acid and 253.2 grams water) |
| 578.0 | weight percent of isopropanol |

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacting the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness of about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black®—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black®). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylpropane triacrylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4 Å molecular sieves. The solution is then returned to the double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then added as well as an additional 28.71 grams of unground carbon (from Chevron Chemical Company, San Ramon, Calif. under the tradename of Shawinigan Black®). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second and the mixture slowly cooled to 40° C. to 48° C. (e.g. about 45° C. The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 Propylene carbonate/triglyme | 34 weight percent |
| Polyethylene oxide | 1 weight percent |
| Polyethylene glycol diacrylate | 8.5 weight percent |
| Ethoxylated trimethylpropane triacrylate | 1.5 weight percent. |

In an alternative embodiment, the requisite amounts of all of the solid components are added directly to the combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992, entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electrocurtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of 4 Å sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) are added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 4.24 grams of $Li^+[Al(OCH_2CH_2OCH_3)_4]^-$ are added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[2] |
|---|---|---|
| Propylene carbonate | 56.51 g | 56.51 |
| Triglyme | 14.13 g | 14.13 |
| Urethane acrylate | 17.56 g | 17.56 |
| $Li^+[Al(OCH_2CH_2OCH_3)_4]^-$ | 9.24 g | 9.24 |
| PEO film forming agent | 2.57 g | 2.57 |
| Total | 100 g | 100 |

[2] = weight percent based on the total weight of the electrolyte solution (100 g)

This solution is then degassed to provide for an electrolyte solution wherein little, if any, of the organometallic ion salt decomposes.

Optionally, solutions produced as above and which contain the prepolymer, the polyalkylene oxide film forming agent, the electrolyte solvent and the Li⁺[Al(OCH$_2$CH$_2$OCH$_3$)$_4$]⁻ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| | |
|---|---|
| Propylene carbonate | 52.472 weight percent |
| Triglyme | 13.099 weight percent |
| Urethane acrylate[3] | 20.379 weight percent |
| Li⁺[Al(OCH$_2$CH$_2$OCH$_3$)$_4$]⁻ | 10.720 weight percent |
| PEO film forming agent[4] | 3.340 weight percent |

[3](Photomer 6140, available from Henkel Corp., Coating and Chemical Division, Ambler, PA)
[4]Polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4 Å molecular sieves (Grade 514, 8–12 Mesh from Schoofs Inc., Moraga, Calif.), then proceed to step 4.

2. Dry the propylene carbonate and triglyme over sodiated 4 Å molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the Li⁺[Al(OCH$_2$CH$_2$OCH$_3$)$_4$]⁻ salt very slowly making sure that the maximum temperature does not exceed 55° C.

8. After the final addition of the Li⁺[Al(OCH$_2$CH$_2$OCH$_3$)$_4$]⁻ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

What is claimed is:

1. A solid, single-phase electrolyte which comprises:

a solid polymeric matrix; and an ionically conducting amount of an organometallic ion salt having the formula:

$$M_c(AR_n)$$

where M is a metal ion selected from the group consisting of Li, Na, K and Mg; A is a metal ion selected from the group consisting of Al and Ti; R is selected from the group consisting of an alkyl group having from 1 to 6 carbon atoms, a mono or dialkyl amine having from 1 to 8 carbon atoms, and a cyclic or linear ether having the formula O(R$_1$O)$_p$ where R$_1$ is an alkyl group having from 1 to 6 carbon atoms, c is 1 or 2 and n is an interger from 1 to 6 and p is from 1 to 4.

2. The said, single-phase electrolyte of claim 1, wherein M is lithium.

3. The solid, single-phase electrolyte of claim 2, wherein the ion salt is Li⁺[Al(OCH$_2$CH$_2$OCH$_3$)$_4$]⁻.

4. The solid, single-phase electrolyte of claim 2, wherein the ion salt is

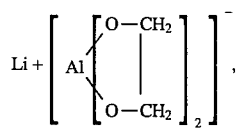

5. The solid, single-phase electrolyte of claim 2, wherein the ion salt is Li$_2$⁺[Ti(OCH$_2$CH$_2$OCH$_3$)$_6$]⁼.

6. The solid, single-phase electrolyte of claim 1, further including an electrolytic solvent.

7. An electrolytic cell which comprises:

an anode containing an anodic material a cathode containing a cathodic material; and interposed therebetween a solid electrolyte which comprises:

a solid polymeric matrix; and an ion conducting amount of an organometallic ion salt having the formula:

$$M_c(AR_n)$$

where M is a metal ion selected from the group consisting of Li, Na, K and Mg; A is a metal ion selected from the group consisting of Al and Ti; R is selected from the group consisting of an alkyl group having from 1 to 6 carbon atoms, a mono or dialkyl amine having from 1 to 8 carbon atoms, and a cyclic or linear ether having the formula $O(R_1O)_p$ where $R_1$ is an alkyl group having from 1 to 6 carbon atoms, c is 1 or 2 and n is an integer from 1 to 6 and p is from 1 to 4.

8. The electrolytic cell of claim 7, wherein M is lithium.

9. The electrolytic cell of claim 8, wherein the ion salt is $Li^+[Al(OCH_2CH_2OCH_3)_4]^-$.

10. The electrolytic cell of claim 8, wherein the ion salt is

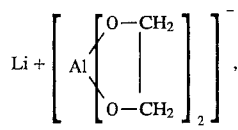

11. The electrolytic cell of claim 9, wherein the ion salt is $Li_2^{++}[Ti(OCH_2CH_2OCH_3)_6]^=$.

12. A method for preparing an electrolytic cell having improved ion conductance which comprises the steps of:

providing an anode;

providing a cathode; and interposing between said anode and cathode a solid electrolyte which comprises a (1) solid polymeric matrix and (2) an ionically conducting amount of an organometallic ion salt having the formula:

where M is a metal ion selected from the group consisting of Li, Na, K and Mg; A is a metal ion selected from the group consisting of Al and Ti; R is selected from the group consisting of an alkyl group having from 1 to 6 carbon atoms, a mono or dialkyl amine having from 1 to 8 carbon atoms, and a cyclic or linear ether having the formula $O(R_1O)_p$ where $R_1$ is an alkyl group having from 1 to 6 carbon atoms, c is 1 or 2 and n is an integer from 1 to 6, and p is from 1 to 4.

13. The method of claim 12, wherein M is lithium.

14. The method of claim 13, wherein the ion salt is $Li^+[Al(OCH_2CH_2OCH_3)_4]^-$.

15. The method of claim 17, wherein the ion salt is

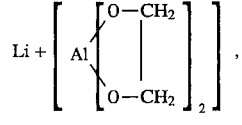

16. The method of claim 13, wherein the ion salt is $Li_2^+[Ti(OCH_2CH_2OCH_3)_6]^=$.

17. The method claim 12, further including an electrolytic solvent.

18. The method of claim 12, wherein the anode is an intercalated base anode comprising carbon.

19. The method of claim 12, wherein the cathode comprises cathodic materials selected from the group consisting of vanadium oxides, lithiated cobalt oxides, and lithiated manganese oxides.

20. The method of claim 19, wherein the anode is an intercalation based anode comprising carbon.

21. A solid, single-phase electrolyte which comprises:

a solid polymeric matrix; and an ionically conducting amount of an organometallic ion salt having the formula:

where M is a metal ion selected from the group consisting of Li, Na, K and Mg; A is a metal ion selected from the group consisting of Al, Ti and B; R is selected from the group consisting of a mono or dialkyl amine having from 1 to 8 carbon atoms, and a cyclic or linear ether having the formula $O(R_1O)_p$ where $R_1$ is an alkyl group having from 1 to 6 carbon atoms, c is 1 or 2 and n is an integer from 1 to 6 and p is from 1 to 4.

22. The said, single-phase electrolyte of claim 21, wherein M is lithium.

23. The solid, single-phase electrolyte of claim 22, wherein the ion salt is selected from the group consisting of $Li^+[Al(OCH_2CH_2OCH_3)_4]^-$,

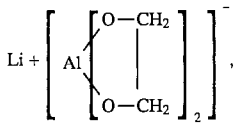

$Li^+[B(OCH_2CH_2OCH_3)_4]^-$, and $Li_2^+[Ti(OCH_2CH_2OCH_3)_6]^=$.

24. An electrolytic cell which comprises:

an anode containing an anodic material;

a cathode containing a cathodic material; and interposed therebetween a solid electrolyte which comprises:

a solid polymeric matrix; and an ion conducting amount of an organometallic ion salt having the formula:

where M is a metal ion selected from the group consisting of Li, Na, K and Mg; A is a metal ion selected from the group consisting of Al, Ti and B; R is selected from the group consisting of a mono or dialkyl amine having from 1 to 8 carbon atoms, and a cyclic or linear ether having the formula $O(R_1O)_p$ where $R_1$ is an alkyl group having from 1 to 6 carbon atoms, c is 1 or 2 and n is an integer from 1 to 6 and p is from 1 to 4.

25. The electrolytic cell of claim 24, wherein M is lithium.

26. The electrolytic cell of claim 25, wherein the ion salt is selected from the group consisting of $Li^+[Al(OCH_2CH_2OCH_3)_4]^-$,

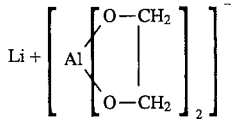

$Li^+[B(OCH_2CH_2OCH_3)_4]^-$, and $Li_2^{++}[Ti(OCH_2CH_2OCH_3)_6]^=$.

27. A method for preparing an electrolytic cell having improved ion conductance which comprises the steps of:

providing an anode;

providing a cathode; and interposing between said anode and cathode a solid electrolyte which comprises a (1) solid polymeric matrix and (2) an ionically conducting amount of an organometallic ion salt having the formula:

where M is a metal ion selected from the group consisting of Li, Na, K and Mg; A is a metal ion selected from the group consisting of Al, Ti and B; R is selected from the group consisting of a mono or dialkyl amine having from 1 to 8 carbon atoms, and a cyclic or linear ether having the formula $O(R_1O)_p$ where $R_1$ is an alkyl group having from 1 to 6 carbon atoms, c is 1 or 2 and n is an integer from 1 to 6 and p is from 1 to 4.

28. The method of claim 27, wherein M is lithium.

29. The method of claim 28, wherein the ion salt is selected from the group consisting of $Li^+[Al(OCH_2CH_2OCH_3)_4]^-$,

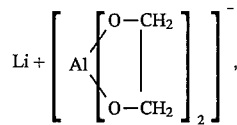

$Li^+[B(OCH_2CH_2OCH_3)_4]^-$, and $Li_2^+[Ti(OCH_2CH_2OCH_3)_6]^=$.

30. The method of claim 24, wherein the anode is an intercalated base anode comprising carbon.

31. The method of claim 24, wherein the cathode comprises cathodic materials selected from the group consisting of vanadium oxides, lithiated cobalt oxides, and lithiated manganese oxides.

32. The method of claim 31, wherein the anode is an intercalation based anode comprising carbon.

* * * * *